(12) United States Patent
Jerebic et al.

(10) Patent No.: US 6,399,145 B1
(45) Date of Patent: Jun. 4, 2002

(54) METHOD FOR COATING LAMP BULBS

(75) Inventors: Simon Jerebic, Regensburg; Frank Vollkommer, Buchendorf, both of (DE)

(73) Assignee: Patent-Treuhand-Gessellschaft fuer Elektrische Gluehlampen mbH, Munich (DE)

( * ) Notice: Subject to any disclaimer, the term of this patent is extended or adjusted under 35 U.S.C. 154(b) by 79 days.

(21) Appl. No.: 09/613,812

(22) Filed: Jul. 11, 2000

(30) Foreign Application Priority Data

Jul. 22, 1999 (DE) .......................... 199 33 893

(51) Int. Cl.[7] .............................. B05D 5/12; B05D 1/18; B05D 3/04; B05C 7/08; B05C 3/02
(52) U.S. Cl. ...................... 427/106; 427/67; 427/430.1; 118/408; 118/410
(58) Field of Search ................ 427/67, 430.1, 427/106; 118/408, 410

(56) References Cited

U.S. PATENT DOCUMENTS

| | | | | | |
|---|---|---|---|---|---|
| 2,184,266 | A | * | 12/1939 | Norgard ....................... | 118/58 |
| 2,444,572 | A | * | 7/1948 | Leet et al. .................... | 118/63 |
| 2,643,956 | A | * | 6/1953 | Kuebler et al. ............... | 427/67 |
| 3,816,938 | A | * | 6/1974 | Podkletnov .................. | 34/247 |
| 3,900,750 | A | * | 8/1975 | Bamberg et al. ............. | 313/44 |
| 4,088,802 | A | * | 5/1978 | Shriver, Jr. .................. | 427/67 |
| 4,230,665 | A | * | 10/1980 | Huber .......................... | 422/64 |
| 4,906,168 | A | * | 3/1990 | Thompson ............... | 417/477.1 |
| 5,318,413 | A | * | 6/1994 | Bertoncini ................... | 417/475 |
| 5,811,924 | A | * | 9/1998 | Okumura et al. ........... | 313/487 |
| 5,965,988 | A | * | 10/1999 | Vollkommer et al. ....... | 315/246 |
| 6,254,921 | B1 | * | 7/2001 | Chappa et al. .............. | 427/2.3 |

* cited by examiner

Primary Examiner—Shrive P. Beck
Assistant Examiner—Michael Cleveland
(74) Attorney, Agent, or Firm—Carlo S. Bessone

(57) ABSTRACT

A method for coating lamp tubes in which a local drying zone tracks a liquid level of the coating material at a constant time interval. The local drying zone may be a heater or air outlet that moves in coordination with the liquid level.

12 Claims, 2 Drawing Sheets

METHOD FOR COATING LAMP BULBS

BACKGROUND OF THE INVENTION.

The present invention relates to a method for producing lamps, in which a lamp tube is coated with a coating means and the coating means is dried.

In many sectors of lamp production, it is necessary for substantially tubular lamp vessels or parts thereof to beg coated. The most important application relates to fluorescent layers, for which reason the invention preferably relates to fluorescent lamps. However, this is not necessary; rather, the invention can also relate to reflective layers or other layers which can also be used in the case of other types of lamp.

The invention proceeds in this case from a method in which a liquid, or at least a flowable coating means is applied to the lamp tube and dried thereafter. A solid layer is produced from the flowable coating means by the drying step. Generally, this comes about through vaporization or evaporation of a liquid, in which the remaining coating means had been dissolved or suspended previously.

In the known, so-called flushing of fluorescent lamp glass tubes, fluorescent pastes are applied in a pasty, that is to say viscously flowable, state to the inner wall of a glass tube. In this case, the inner wall of the glass tube which is to be coated is brought into contact with the fluorescent paste, for example by flushing the glass tube. Thereupon, the fluorescent paste is allowed to run off until a relatively thin layer remains on the glass wall. The glass tube is then dried in a oven. An essential quality criterion in this case is to observe a prescribed layer thickness- as consistently as possible. On the one hand, the glass wall is to be completely covered, and penetration of UV radiation through the fluorescent layer is to be avoided, while on the other hand in the case of excessively thick fluorescent layers it is impossible to avoid losses through multiple reflections of visible photons in the fluorescent layers. Furthermore, the material costs of the fluorescent paste play a not unimportant role.

The technical problem on which this invention is based consists in specifying a novel method for coating lamp tubes with a coating means which can be used to achieve particularly uniform layer thicknesses.

SUMMARY OF THE INVENTION.

According to the invention, this problem is solved by means of a method for producing lamps, in which a lamp tube is coated with a coating means and the coating means is dried, characterized in that a liquid level of the coating means is lowered along the lamp tube, and a local drying zone of a layer, left behind by the sinking of the liquid level, of the coating means on the lamp tube tracks the sinking liquid level at a substantially constant time interval.

Thus, according to the invention the running off of the excess coating means from the wall of the lamp tube is achieved in a particularly controlled way by permitting a liquid level to sink. Specifically, it has emerged that drips, or even drops are a substantial cause of layering non-uniformities in conventional methods.

The invention also provides for a drying zone to track the sinking liquid level at a substantially constant time interval. As a result, substantially the same time elapses for all parts of the layer between the sinking of the liquid level at this point and the drying. Specifically, it has further turned out that the non-uniformity of the drying time for different parts of the layer produced is a further main cause of non-uniformities.

Thus, when a coating means which has been rinsed in is allowed to run out, and the entire lamp tube is dried in a oven, it cannot be avoided that the higher lying parts of the layer become thinner than the deeper lying parts, because the coating means which runs off from the higher lying parts stills passes the deeper lying parts. Consequently, a lesser residual layer thickness remains in the higher lying parts than in the deeper lying parts. It is also scarcely possible in the case of the conventional methods to take account of these circumstances with the aid of the drying process by, for example, carrying it out in temporal sequence from top to bottom in a continuous fashion. Specifically, this is because the remains of the coating means which are running out do not prescribe any defined temporal sequence for the drying process. Rather, what happens is more an undefined and statistically varying running out, which does not necessarily leave the same coating thickness on parts of the lamp tube at the same level, because drips or even drops come to be formed, as already mentioned.

The layers are preferably situated inside the lamp tube, the liquid level then being lowered in the lamp tube. For this purpose, the lamp tube is first filled with the coating means, whereupon the coating means then run out as a liquid column, that is to say with a largely defined upper liquid level. It is to be noted in this case that the term "liquid" in the description of this invention also includes viscous, but still flowable, media. Thus, here liquid also means pulp or paste, as long as flowability obtains.

Furthermore, the lamp tube is preferably arranged vertically, as a result of which it is possible to achieve the best uniformity over the circumference of the lamp tube (inner or outer circumference) to be coated.

So far, the discussion has been of a "drying zone" in a general sense. In fact, the invention can also be understood in general such that it is possible to produce in any way a drying zone which is locally defined to the extent that it is possible to talk of tracking in relation to the liquid level at a constant time interval. In general, a drying device is moved relative to the lamp tube in a fashion coordinated with the sinking of the liquid level. However, it is also possible in the case of a fixed relationship between a drying device and the lamp tube to produce a moving drying zone, for example by sequential use of different drying zones in a drying device. The degree of local definition of the drying zones in this case relates also only to the side facing the liquid level. On the other side, on which the coating means at least is dried to such an extent that no more changes in its thickness can take place by flowing processes, no fundamental role is played by the extent to which the drying zone extends or is defined at all. On the side facing the liquid level, as well, the concept of the degree of local definition is not to be understood that there must be a sharp boundary of the drying zone. For all parts of the wall of the lamp tube which are to be coated, it is essentially fully sufficient to have essentially equal time intervals from the liquid level up to a drying which fixes a layer thickness, and so the drying zone is also only to be locally defined to that extent.

The invention is preferably directed to the two variants of the production of such a drying zone. In the first variant, a local heating of the coating means and/or of the lamp tube is carried out. This can be carried out in a favourable way by relative movement between the lamp tube and a oven surrounding the lamp tube, the drying zone generally lying somewhat above the lower edge of the oven. Reference may be made to the first exemplary embodiment for this purpose.

The second variant consists in circulating a gas atmosphere e which serves the purpose of drying. For example, this can be done by introducing into the lamp tube an aerating tube which is essentially parallel to the lamp tube, and tracking with reference to the liquid level. A drying gas can flow in this case through the aerating tube. This can be done by causing the drying gas to flow in through the aerating tube, or else by sucking in or discharging it through the aerating tube and feeding it in another way. In each case, what is important is that there is produced above the liquid level at a certain distance a turbulence zone of the drying gas in which the drying is performed. The turbulence zone is formed below the opening, facing the liquid level, in the aerating tube, and should be deeper-lying than the openings for discharging or feeding the drying gas of the lamp tube (that is to say, not of the aerating tube). The drying gas flow then does not advance right up to the liquid level, but flows along just below the opening in the aerating tube, and then flows upwards on the outside of the aerating tube to the abovementioned higher-lying openings (or in the reverse direction). Reference may be made to the second exemplary embodiment for this purpose. The drying gas can be heated; however, this is not mandatory.

There are various possibilities with regard to the temporally constant interval between the liquid level and the drying zone. On the one hand, the coating means can simply be allowed to run out, for example by constricting for throttling the speed. Of course, this gives rise to a non-constant speed profile which the drying zone must correspondingly track. However, it is also possible to provide a time profile for the sinking of the liquid level, for example by discharging the coating means in a controlled fashion. A preferred embodiment provides for this purpose a hose pump which blocks off a hose communicating with the coating means and displaces the blocked-off region, for example with the aid of a stepping motor, at the desired speed. By repeating this operation, the hose pump pumps the coating means off via this hose, as a result of which, for example, it is possible to achieve a constant speed for the lowering of the liquid level.

Another possibility consists in using a vessel communicating with the coating means. When the flow resistance of the connection between the coating means and this vessel is not too high at the targeted speed of lowering, the sinking of the liquid level can be controlled by lowering the vessel.

Furthermore, it is possible to use a pump piston which is moved in a fashion coordinated with the drying zone. A stepping motor can be used for the movement, for example. It is particularly advantageous when the pump piston is moved at the same speed as the targeted movement of the liquid level. The pump cross section must correspond to the cross section of the liquid level for this purpose. It is then possible to use mechanical coupling in order to coordinate the movement of the drying zone and the movement of the liquid level with one another, for example a mechanical coupling between the already mentioned short tubular oven and the pump piston, or between the aerating tube and the pump piston. Such a coupling can also be expedient in the case of other pump types.

It is also possible to control the speed at which the coating means runs off, that is to say the movement of the liquid level, by influencing an atmospheric pressure above the liquid level or in a vessel communicating with the coating means.

In selecting the temporal interval between the liquid level and the drying front, it is possible to contribute to avoiding the formation of drops or drips by means of relatively short temporal intervals. Of course, drying the liquid level itself should be avoided. It is expedient to select the spatial distance to be shorter than the lamp tube length, although this is not mandatory. For example, spatial distances of 70% of the lamp tube length and less are suitable. Precisely with regard to a short temporal interval, it is generally to be recommended, for the purpose of avoiding excessively high lowering speeds, to operate at even shorter spatial distances, for example at at most 50%, at most 30%, or else at at most 15% of the length of the lamp tube.

It has already been stated that the invention is important chiefly for fluorescent lamps. This holds for conventional fluorescent lamps with Hg discharges, but also for fluorescent lamps which are designed for dielectrically impeded discharges, that is to say have at least one dielectrically impeded electrode. An important application in both cases is the production of fluorescent layers. The reasons for the importance of the uniformity for fluorescent layers have already been discussed above. Particularly in the case of Hg discharges, it is important to ensure a specific minimum thickness in all regions of the discharge vessel which come into contact with the discharge, since otherwise there is the risk of a reaction of the Hg with the glass of the discharge vessel. This gives rise to blackenings of the lamp and shortened service lives. In the case of discharge lamps for dielectrically impeded discharges, there are various fields of application which the homogeneity of the light emission is of particular importance. On the one hand, these are the flat radiators for background lighting of displays and screens, while on the other hand there are also tubular lamps for copiers, scanners and the like. In all these applications associated with imaging processes, an inhomogeneity is expressed directly in image errors.

Chiefly in the case of discharge lamps for dielectrically impeded discharges (as also in the case of lamps in general), however, use is also made of reflective layers in order to prevent the emission of light to one side and to optimize it to the other side, or in order to improve the uniformity of the emission of light. Inhomogeneities in the layer thickness of the reflective layers are therefore also to be avoided. On the one hand, they can have a direct influence on the light emission properties. On the other hand, they can entail inhomogeneities in a fluorescent layer which is to be applied to the reflective layer.

In particular, the invention permits the production of relatively thick uniform reflective layers of, for example, more than 3.5 and even more than 4 or 5, or still better more than 7 $mg/cm^2$. Such layer thicknesses are possible using conventional methods only by accepting substantial inhomogeneities.

It is also possible to produce relatively thick fluorescent layers which have led to problems in the conventional case. Thus, fluorescent layers of more than 1.2 or even more than 3 $mg/cm^2$ are possible.

Another possible application is reaction blocking layers in the case of conventional discharge lamps, which are intended to prevent reactions of Hg with the glass wall. These layers (Alon-C layers) are generally relatively thin.

BRIEF DESCRIPTION OF THE DRAWINGS.

The invention is described in more detail below with the aid of two concrete exemplary embodiments, it also being possible for the disclosed features to be essential to the invention in other combinations. In detail.

DESCRIPTION OF THE PREFERRED EMBODIMENTS.

Figure 1:
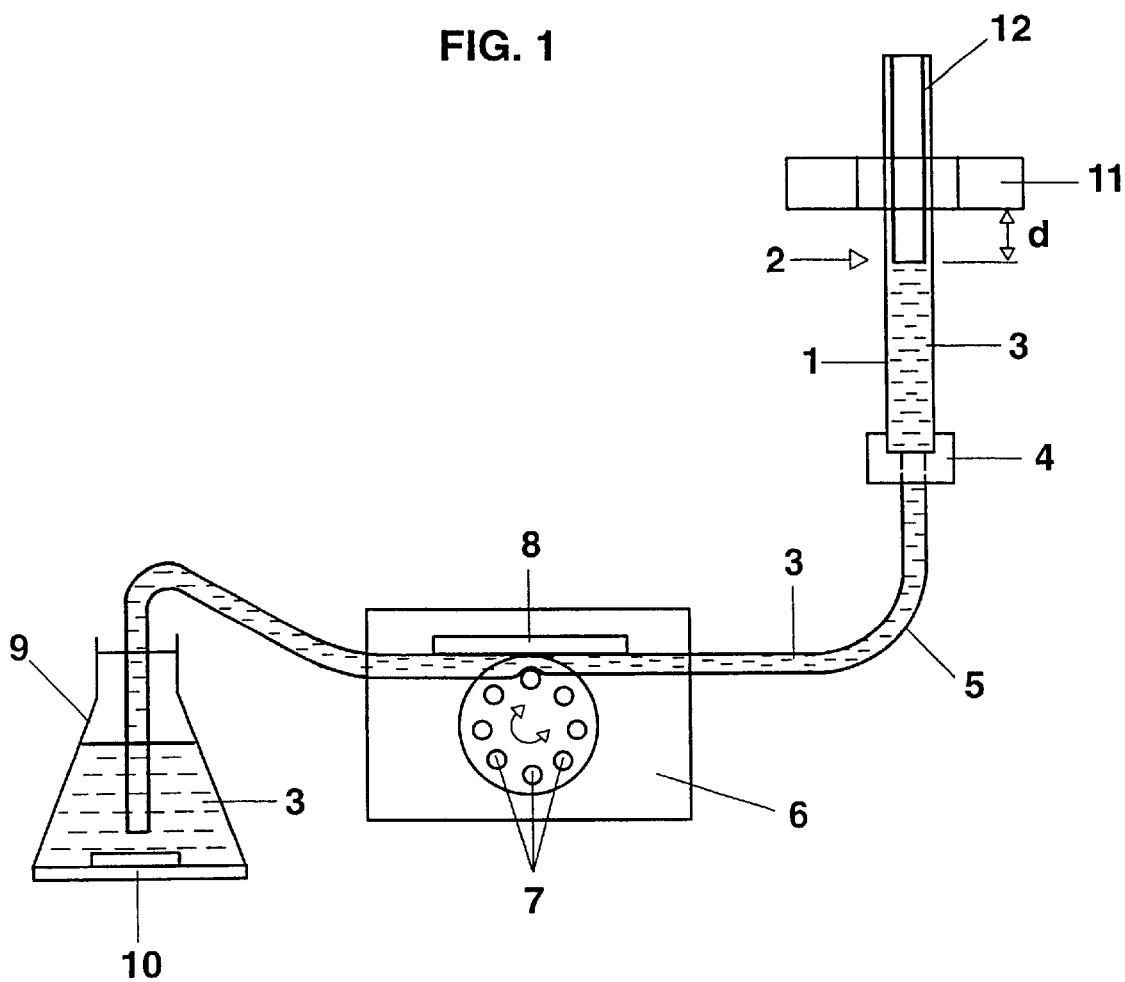
FIG. 1 shows a diagrammatic illustration of the first exemplary embodiment.

The first exemplary embodiment is illustrated in FIG. 1. 1 denotes a glass tube which is used for a discharge vessel of a discharge lamp. Depending on dimensions and selection of the coating means, this can be a glass tube both for a conventional Hg discharge lamp, or else for a tubular discharge lamp with dielectrically impeded discharges.

The glass tube 1 is arranged vertically and filled up to a liquid level 2 with a coating means 3. The coating means 3 contains fluorescent materials in aqueous suspension. It has a pasty, viscously flowable consistency. At the lower end, the glass tube 1 is sealed with the aid of a stopper 4 which connects a hose line 5 to the interior of the glass tube 1. The hose line 5 is therefore also filled with the coating means 3.

Connected to the hose line 5 is a hose pump 6 which has a wheel which can be driven by a stepping motor and pins 7 arranged parallel to the axis of rotation thereof at a specific radius. The pins 7 pinch the hose line 5 against a bearing surface 8 when they are arranged in the upper region of the wheel. The cross section of the hose line 5 is thereby compressed. When the wheel is rotated (anticlockwise in the figure), the pins 7 are moved along the hose line 5 and the bearing surface 8 in a direction leading away from the glass tube 1, whilst producing a pumping action which can be controlled by the rate of rotation of the wheel.

Consequently, the coating means 3 is pumped out of the glass tube 1 via the hose line 5 and flows off into a vessel 9. Thus, the stepping motor can be used to set the position of the liquid level 2 and move it in a controlled fashion.

The vessel 9 stands on a magnetic stirrer 10. The latter serves to mix the coating means paste 3 before the coating operation. At this instant, the entire coating means 3 is located in the vessel 9 and can be pumped up into the glass tube 1 by operating the hose pump 6 in a fashion opposite to the description just given, until the liquid level 2 reaches the upper edge of the glass tube 1. Thereupon there is a controlled run off with a controlled lowering of the liquid level 2 at constant speed by means of a constant rate of rotation of the wheel of the hose pump 6 in the anticlockwise sense.

In this case, an oven 11, which is represented diagrammatically, is refilled at a constant time interval and, because of the uniform movement of the liquid level 2, also at a constant spatial distance relative to the liquid level 2. The spatial distance is denoted by d in FIG. 1. It is to be borne in mind, however, that it is actually the time interval which is important for the invention, and that the spatial distance d can vary in the case of non-uniform movements.

The drying oven 11 surrounds the glass tube 1 and generates at its middle a local heating zone which corresponds to the local drying zone. When the oven 11 has passed over a region of the glass tube 1 with coating means 12 adhering thereto, the coating means 3 is dried at least to the extent that there is no longer any flowability, and the layer thickness can no longer be impaired. Of course, it is still possible thereafter for residual drying processes to take place in the atmosphere owing to the residual heat or at room temperature.

The oven 11 is moved by a mechanical device (not illustrated in more detail) which, given a suitable transmission, can be driven by the stepping motor of the hose pump 6. As a result, the oven and the hose pump are mechanically coupled, for which reason the movements are coordinated automatically. The liquid level 2 can be varied for the purpose of varying the distance d. For example, it could be possible to decouple the hose pump 6 from its motor in order to set the liquid level 2 by manual operation. Of course, it is also possible to design the fastening of the oven 11 on its movement device in an adjustable fashion.

This exemplary embodiment is chiefly intended to illustrate the basis principle of the invention in the case when the liquid level 2 is permitted to run off or be pumped off in a controlled fashion. To this extent, this is only a diagrammatic illustration. In actual industrial application, it would, of course, be possible to use an appropriately adapted apparatus whose details are, however, immediately clear to the person skilled in the art from the illustration of the principle given here.

Figure 2:
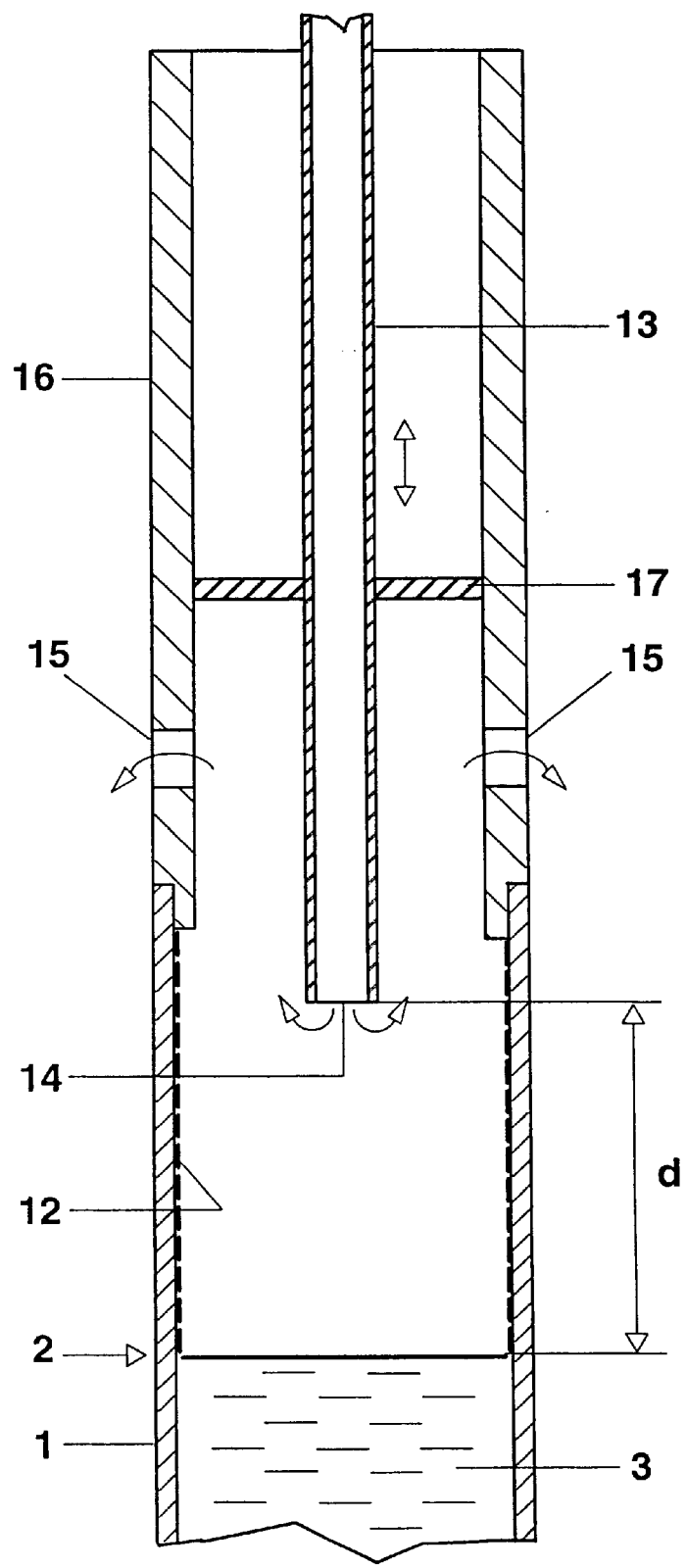
FIG. 2 shows a diagrammatic illustration of the second exemplary embodiment.

FIG. 2 shows the second exemplary embodiment, parts corresponding to the illustration in FIG. 1 being denoted by the same reference numerals. The deviations from the first exemplary embodiment are explained below.

In this case, the coating means 3 is an ethanol suspension of $TiO_2$ as reflective material. Instead of the oven 11, use is made here of an aerating tube 13 which is inserted into the glass tube 1 from above. The lower end of the aerating tube 13 has an opening 14 from which air flows out. If the aerating tube is held above the liquid level 2 at a specific constant distance d which, in turn, corresponds to a constant time interval because of the uniform speed, an air turbulence zone is formed below the opening 14. Directly above the liquid level 2, however, an atmosphere is produced which is largely saturated with ethanol and is subjected only very weakly to turbulence. Actual drying therefore occurs only in the region directly below the opening 14, where the ethanol vapours of the coating means 3 on the walls of the glass tube 1 are picked up and led away upwards with the out-flowing air outside the aerating tube 13 but inside the glass tube 1. Provided in the upper region are openings 15 in an attachment 16 on the glass tube 1, which openings are available for the exit of air. The attachment 16 serves to guide the aerating tube 13 via a guide disk 17, and is, furthermore, part of the holder (not illustrated in detail) for the glass tube 1.

An exemplary set of parameters for the above second exemplary embodiment is as follows. Given a length of 300 mm for the glass tube 1 and an inside diameter of 8.6 mm, the weight of the layer is 6.0 mg/cm$^2$ in the case of a distance of 43 mm between the liquid level 2 and the opening 14 in the case of a constant speed of displacement of 6 mm/sec. The starting material in this case is a coating means consisting of 200 g $TiO_2$ and 60 ml of cellulose nitrate (10%) in 100 ml of ethanol. The drying is performed by a throughflow of air at 28 l/h of air at a temperature of approximately 22° C. The aerating tube 13 has an outside diameter in this case of 1.6 mm and an inside diameter of 0.8 mm.

In the form illustrated, this second exemplary embodiment is chiefly suitable for readily volatile carrier liquids of the coating means 3. however, it is also possible for heated air to be fed, with the result that even aqueous solutions can be dried, as in the case of the first exemplary embodiment. Again, it is, of course also possible to combine the solutions of the two exemplary embodiments.

Overall, the invention offers the possibility of producing exceptionally uniform, non-defective layers even in the case of relatively large layer thicknesses. Furthermore, it is very economic in terms of time, because the application of the coating means ("flushing") and the drying of the layer produced can be carried out in one operation.

What is claimed is:

1. A method for coating and drying a lamp tube, the method comprising the steps of:

submerging a surface of an upright lamp tube in a flowable coating material so that a portion of the lamp tube to be coated is covered by the flowable material;

positioning a movable heating oven adjacent to the surface of the lamp tube above the portion to be coated;

lowering a level of the flowable material at the surface of the lamp tube at a controlled rate; and moving the heating oven down the lamp tube in coordination with the lowering of the level of the flowable material to dry the flowable material on the surface.

2. The method of claim 1, wherein the moving step comprises the step of controlling a speed of movement of the heating oven so that along the portion to be coated a time between passage of the level of the flowable material and subsequent drying by heat from the heating oven is constant.

3. The method of claim 1, wherein the moving step comprises the step of moving the heating oven at the controlled rate.

4. The method of claim 1, wherein the submerging step comprises the step of pumping the flowable coating material into a bottom of the lamp tube.

5. The method of claim 1, wherein the submerging step comprises the step of pumping the flowable coating material with a pump operating in a first direction and the lowering step comprises the step of pumping the flowable coating material with the pump operating in a second direction opposite the first direction.

6. The method of claim 5, further comprising the step of coupling movement of the heating oven to the pump.

7. A method for coating and drying a lamp tube, the method comprising the steps of:

submerging a surface of an upright lamp tube in a flowable coating material so that a portion of the lamp tube to be coated is covered by the flowable material;

positioning a movable drying gas outlet adjacent to the surface of the lamp tube above the portion to be coated;

lowering a level of the flowable material at the surface of the lamp tube at a controlled rate; and moving the drying gas outlet down the lamp tube in coordination with the lowering of the level of the flowable material to dry the flowable material on the surface.

8. The method of claim 7, wherein the moving step comprises the step of controlling a speed of movement of the drying gas outlet so that along the portion to be coated a time between passage of the level of the flowable material and subsequent drying by the drying gas is constant.

9. The method of claim 7, wherein the moving step comprises the step of moving the drying gas outlet at the controlled rate.

10. The method of claim 7, wherein the submerging step comprises the step of pumping the flowable coating material into a bottom of the lamp tube.

11. The method of claim 7, wherein the submerging step comprises the step of pumping the flowable coating material with a pump operating in a first direction and the lowering step comprises the step of pumping the flowable coating material with the pump operating in a second direction opposite the first direction.

12. The method of claim 11, further comprising the step of coupling movement of the drying gas outlet to the pump.

* * * * *